United States Patent
Ferro et al.

(10) Patent No.: US 7,996,121 B2
(45) Date of Patent: Aug. 9, 2011

(54) DEVICE AND METHOD FOR ASSISTING IN THE MANAGEMENT OF AN ENGINE FAILURE ON AN AIRCRAFT

(75) Inventors: Daniel Ferro, Muret (FR); Amelie David, Toulouse (FR)

(73) Assignee: Airbus France, Toulouse (FR)

( * ) Notice: Subject to any disclaimer, the term of this patent is extended or adjusted under 35 U.S.C. 154(b) by 677 days.

(21) Appl. No.: 12/027,229

(22) Filed: Feb. 6, 2008

(65) Prior Publication Data

US 2008/0243318 A1 Oct. 2, 2008

(30) Foreign Application Priority Data

Feb. 7, 2007 (FR) ..................... 07 00861

(51) Int. Cl.
*G05D 1/00* (2006.01)
*G06F 7/00* (2006.01)
(52) U.S. Cl. .................. 701/11; 701/3; 701/16; 701/29; 701/120; 244/183
(58) Field of Classification Search .................... 701/11, 701/123, 204, 120, 3–5, 16–18, 208, 29; 244/180, 183, 186
See application file for complete search history.

(56) References Cited

U.S. PATENT DOCUMENTS

| | | | |
|---|---|---|---|
| 4,964,599 A | 10/1990 | Farineau | |
| 6,352,223 B1 | 3/2002 | Larramendy | |
| 7,584,046 B2 * | 9/2009 | Deker | 701/120 |
| 2002/0140578 A1 | 10/2002 | Price | |
| 2003/0060940 A1 | 3/2003 | Humbard | |
| 2007/0088492 A1 * | 4/2007 | Bitar et al. | 701/120 |

FOREIGN PATENT DOCUMENTS

| | | |
|---|---|---|
| EP | 0 743 580 | 11/1996 |
| EP | 2 789 500 | 8/2000 |
| EP | 1 243 895 | 9/2002 |
| FR | 2 617 120 | 12/1988 |
| FR | 2 881 533 | 8/2006 |

OTHER PUBLICATIONS

Preliminary Search Report dated Sep. 5, 2007.

* cited by examiner

*Primary Examiner* — Gertrude Arthur Jeanglaud
(74) *Attorney, Agent, or Firm* — Dickinson Wright PLLC

(57) ABSTRACT

A device and method for assisting in the management of an engine failure on an aircraft: (1) determine, when an engine failure occurs, flight profiles allowing the closest airports to be reached according to flight strategies and (2) present, on a screen, the airports associated with the determined flight profiles and corresponding predictions.

17 Claims, 2 Drawing Sheets

DEVICE AND METHOD FOR ASSISTING IN THE MANAGEMENT OF AN ENGINE FAILURE ON AN AIRCRAFT

FIELD OF THE INVENTION

The present invention relates to a method and a device for assisting in the management of an engine failure on a multi-engine aircraft, in particular of a multi-motor transport plane.

BACKROUND OF THE RELATED ART

It is known that the occurrence, during the flight of a transport plane, of a failure of one of its engines demands that the flight crew react quickly in order to ensure its safety in the short-term (control of the thrust and of the instantaneous trajectory), then define the procedure to be followed in the longer term. The latter may consist in:
  continuing the flight, if necessary at a lower altitude; or
  returning to the departure airport; or
  diverting to an alternate airport.

The operations control center of each airline prepares a flight folder for each flight. This flight folder could include fall-back trajectories in case of engine failure. Such a fall-back trajectory is actually obligatory for air operations referred to as "ETOPS" (Extended Twin-engine Operations) that cover twin-engine flights of which at least a portion is at over one hour flying time from any airport.

When an engine failure occurs, in addition to dealing with the failure itself (shutdown defective engine, etc.), the flight crew must carry out a certain number of relatively complex tasks:
  adapt the thrust on the engine or engines that remain available;
  communicate with the air traffic controllers;
  define the destination (which could be a new one) and input it into the flight management processor, for example of the FMS (Flight Management System) type, together with the trajectory for flying to this destination;
  define the flight strategy in the vertical plane according to the environment, in other words:
    choose the climb or descent slope, then the new flight level;
    choose the new speed profile; and
  ensure that the aircraft performance parameters (which, with one less engine, systematically over-consume fuel) will allow the chosen destination to be reached.

As a result, the occurrence of an engine failure leads to a significant increase in the workload of the flight crew of the plane.

A system is known from the document FR-2 789 500 that comprises means capable of detecting any engine failure of a multi-engine aircraft and that allows the yaw control of the aircraft to be improved when an engine failure is detected. This system is based on the enhancement of an electrical flight control system described in the document FR-2 617 120.

It is also known that many flights go through portions of airspace for which the notion of invariable airway does not apply. This is in particular the case above oceanic regions, for which substantially parallel routes are constructed by countries and defined on a daily basis as a function of the weather conditions and of the traffic requests presented by the airlines by means of a system called OTS (Organized Track System). For each of these routes, the aircraft may be separated:
  vertically: every 2000 feet (around 600 meters) for example; and
  longitudinally (for the same flight level): generally every 10 minutes as a minimum.

When an engine failure occurs while the aircraft is situated on one of these routes which are, in general, laterally separated by 60 nautical miles (around 110 km), it is recommended to move away reasonably quickly from the planned route. The reason for this is that, owing to the loss of altitude induced by the engine failure, there is a non-negligible risk of coming into conflict with an aircraft flying under this route. It is generally accepted that the best strategy consists in turning by 90° and taking the aircraft to an intermediate lateral route.

The occurrence of an in-flight engine failure therefore constitutes one of the most critical cases in aeronautics. It very often causes anxiety and stress for the pilots, in addition to a significant increase in the workload, as previously indicated. On top of that must be added the fact that the aircraft must clear obstacles due to mountainous terrain (more critical because the flight ceiling decreases owing to the engine failure) and that, in the case where only one engine remains in operation, draconian regulations limit the flight time (for single-engine operation).

The procedures to be implemented by the crew in such a situation are therefore time-consuming and complex, and as a result open the door, in a stressful situation, to errors, confusion, forgetfulness, etc.

SUMMARY OF THE INVENTION

The present invention relates to a method for assisting in the management of an engine failure of a multi-engine aircraft, in particular a multi-engine transport plane, that allows the aforementioned drawbacks to be overcome.

For this purpose, according to the invention, said method, according to which the engines on said aircraft are monitored during a flight in such a manner as to be able to detect any engine failure, is noteworthy in that, when an engine failure is detected during a flight, the following series of successive steps are automatically carried out:
a) the current values of parameters relating to the aircraft, including its current position, are determined;
b) a number n of airports that are the n closest airports to said current position of the aircraft is determined, where n is an integer (greater than or equal to 1);
c) for each of these n airports, a lateral trajectory is determined that allows the aircraft to fly directly to the corresponding airport starting from said current position;
d) for each of these n airports, at least one flight profile is determined that is defined according to the corresponding lateral trajectory in accordance with a flight strategy, the flight profile comprising, in the vertical plane, an altitude profile and a speed profile along the corresponding lateral trajectory, and predictions are made relating to each of these flight profiles;
e) depending on at least some of said predictions, the flight profiles not satisfying pre-determined conditions are identified (and potentially removed); and
f) all the airports are shown on the display screen of the aircraft highlighting those that do not satisfy said pre-determined conditions, together with the associated conditions.

Thus, thanks to the invention, when an engine failure is detected, all the flight profiles allowing the aircraft to fly to destination airports (initially planned arrival airport, departure airport and/or diversion airport). The technical crew, and notably a pilot of the aircraft, is thus able to acquire, from a simple observation of the display screen, an overall view of the situation allowing him to quickly and calmly choose both the destination airport and the flight strategy (in the vertical plane) in order to fly there. This allows his workload, and also his stress, to be considerably reduced in such a situation which is particularly critical.

The method according to the present invention therefore provides a valuable assistance in the management of an engine failure on a multi-engine aircraft.

Advantageously, at step d), for each of the n airports are determined a plurality of flight profiles, which are respectively determined according to a plurality of different flight strategies. In this case, preferably, the following flight strategies are used:
  a standard strategy consisting in flying the aircraft so as to minimize the fuel consumption;
  a strategy with minimum flight time consisting in flying the aircraft at the highest possible speed; and
  an obstacle clearance strategy consisting in flying the aircraft as high as possible.

Furthermore, advantageously, at step d), at least the following predictions are made:
  the time of arrival (at the destination airport);
  the quantity of fuel on board on arrival (at the destination airport);
  the adherence to an obstacle clearance criterion.

In a preferred embodiment, at step e), at least the flight profiles are identified, and potentially removed, for which:
  a destination fuel prediction is less than a pre-determined value; and
  an obstacle clearance prediction is made with a margin that is below an allowed vertical limit.

In addition, advantageously, at step e), the flight profiles relating to airports having incompatible runways are also identified and potentially removed.

It will be noted that the airports and/or the flight strategies identified as being unsuitable are highlighted on the display screen (for example by a color and/or using special symbols), or even removed from the display.

Furthermore, advantageously, at step f), the various flight profiles are presented sorting them according to at least one pre-determined criterion, for example in decreasing order of flight times or decreasing order of flight distances, for each of the flight strategies taken into account at step d). This allows the appreciation of the situation to be facilitated for the pilot when he looks at the information presented on the display screen.

In addition, advantageously:
  selection means are provided that allow an operator, in particular the pilot of the aircraft, to select one of said flight profiles presented at step f) on the display screen;
  vectoring settings are automatically determined allowing the aircraft to fly according to the flight profile selected using said selection means; and
  the vectoring settings thus determined are automatically transmitted to a guidance system (comprising for example an automatic pilot and/or auto-throttle) allowing them to be automatically implemented on the aircraft.

Thus, the vectoring operations for the aircraft, allowing it to fly to the destination airport selected by the pilot, are carried out automatically which considerably reduces the workload of the pilot. Indeed, the latter only has to perform a single task, namely to select the destination airport (and the associated flight profile), based on the various pieces of information automatically presented on the display screen, as previously mentioned.

In one particular embodiment, advantageously:
  in addition, the closest airport in flight time from said current position is automatically determined; and
  this airport is automatically presented on the display screen.

This particular embodiment serves to cover the case where, depending on the flight and weather conditions, the closest airport in terms of flight time is not necessarily that which is closest in terms of distance starting from the position of the aircraft at the time of the engine failure.

Furthermore, advantageously:
  in addition, a short-term lateral trajectory is automatically determined allowing any collision of the aircraft with an aircraft in the neighborhood to be avoided; and
  this short-term lateral trajectory is automatically presented on the display screen.

In this case, advantageously:
  vectoring settings are also automatically determined that allow the aircraft to fly along said short-term lateral trajectory; and
  these vectoring settings are automatically transmitted to a guidance system (comprising for example an automatic pilot and/or auto-throttle) allowing them to be automatically implemented.

Furthermore, in one particular embodiment, advantageously:
  in addition, a lateral trajectory is automatically determined that is offset by a particular distance with respect to an initial trajectory obtained following a change of route, for example by 90°, said particular distance being adaptable; and
  this lateral trajectory is automatically presented on the display screen.

Furthermore, in a preferred embodiment, at step d), for each of the n airports, the following series of operations are carried out with the aim of determining the flight profile relating to a particular flight strategy:
d1) a setpoint altitude is calculated which is characteristic of said flight strategy;
d2) at least one speed parameter is calculated which is also characteristic of said flight strategy;
d3) the effective altitude of the aircraft when the engine failure occurs is compared with the setpoint altitude which is characteristic of said flight strategy and, depending on the result of this comparison, a first profile allowing the aircraft to fly to said setpoint altitude is determined;
d4) using said speed parameter, a second profile is determined that corresponds to cruising flight at said setpoint altitude along the corresponding lateral trajectory as far as the point of descent;
d5) a third profile is determined that corresponds to a descent profile from the setpoint altitude to the corresponding airport, by performing a calculation in reverse from the airport back to the setpoint altitude; and
d6) said point of descent is determined as the point of intersection between said descent profile and the setpoint altitude,
said flight profile corresponding to the succession of said first, second and third profiles thus determined.

The present invention also relates to a device for assisting in the management of an engine failure on a multi-engine aircraft, in particular on a multi-engine transport plane.

According to the invention, said device of the type comprising first means capable of automatically detecting, during a flight of the multi-engine aircraft, a failure of an engine of said aircraft is noteworthy in that it additionally comprises:

second means for automatically determining, when such a detection occurs, the current values of parameters relating to the aircraft, including its current position;

third means for automatically determining a number n of airports which are the n closest airports to said current position of the aircraft, n being an integer;

fourth means for automatically determining, for each of these n airports, a lateral trajectory allowing the aircraft to fly directly to the corresponding airport starting from said current position;

fifth means for automatically determining, for each of these n airports, at least one flight profile defined according to the corresponding lateral trajectory in accordance with a flight strategy, said flight profile comprising, in the vertical plane, an altitude profile and a speed profile along the corresponding lateral trajectory, and for making predictions relating to each of these flight profiles;

sixth means for automatically identifying and potentially removing, depending on at least some of said predictions, the flight profiles that do not satisfy pre-determined conditions; and a display system for presenting, on a display screen of the aircraft, all the flight profiles while potentially highlighting (for an enhanced appreciation), or even eliminating, those deemed to be unsuitable, together with the associated predictions.

Furthermore, in one particular embodiment, said device additionally comprises:

selection means allowing an operator to select one of said flight profiles presented on the display screen;

means for determining, automatically, vectoring settings allowing the aircraft to fly according to the selected flight profile using said selection means; and a guidance system (comprising for example an automatic pilot and/or auto-throttle) allowing said vectoring settings to be implemented automatically.

Furthermore, advantageously, said device comprises, at its input, at least some of the following information:

for each of the portions of the flight plan, a prescribed diversion airport;

a flight strategy in the vertical plane for flying to this destination airport; and flight level and speed settings for flying to this destination airport.

BRIEF DESCRIPTION OF THE DRAWINGS

The figures of the appended drawing will clearly explain how the invention may be embodied. In these figures, identical references denote similar elements.

DETAILED DECRIPTION OF THE INVENTION

Figure 1:
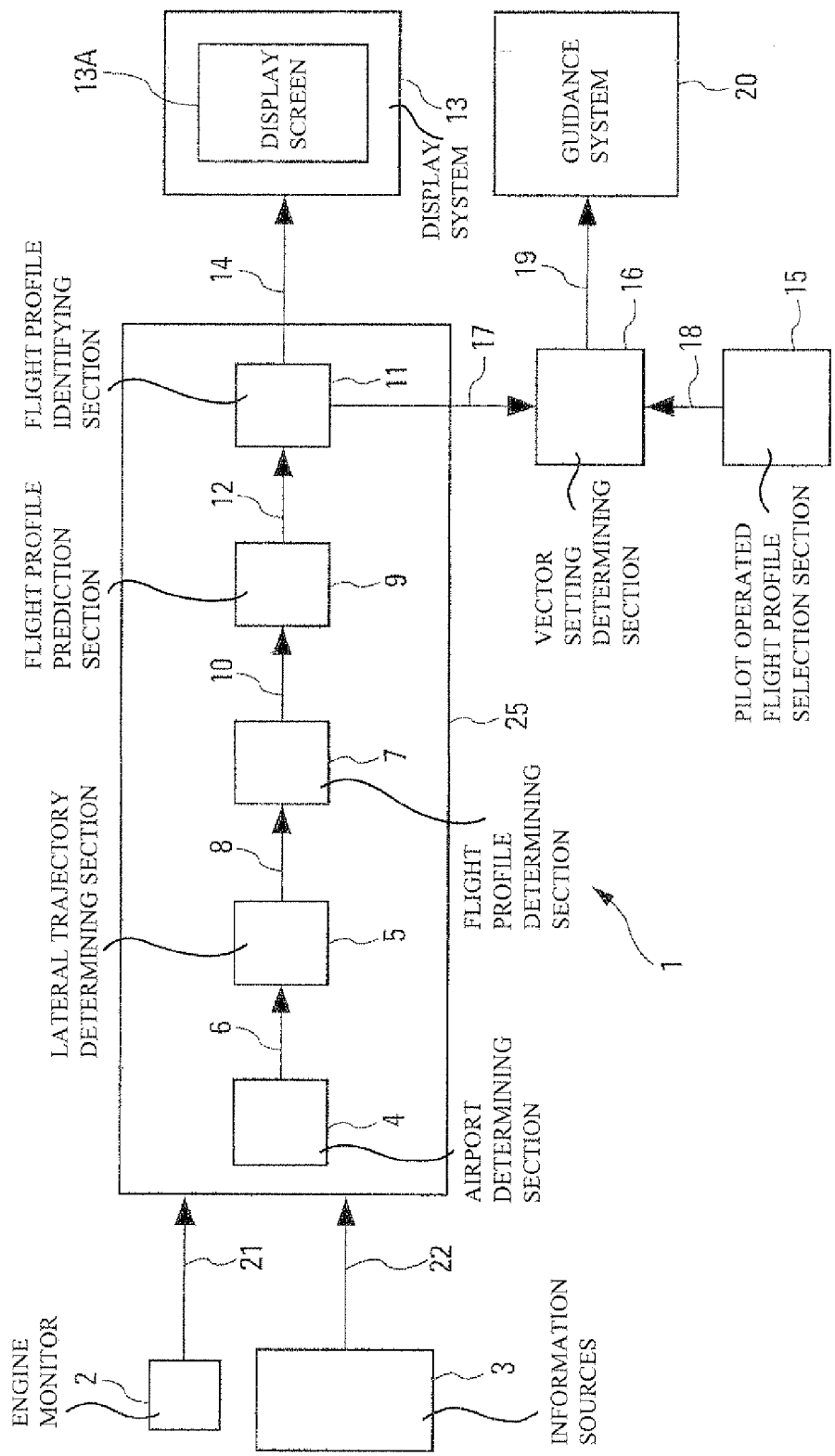
FIG. 1 is a block diagram of a device according to the invention.

The device according to the invention and shown schematically in FIG. 1 is designed to assist the flight crew of a multi-engine aircraft A, in particular of a multi-engine transport plane, in managing an engine failure.

For this purpose, this device 1 notably comprises means 2 that monitor the various engines of the aircraft A and that are capable of automatically detecting, in a usual manner, during a flight of the aircraft A, any failure of any one of said engines (not shown).

Figure 2:
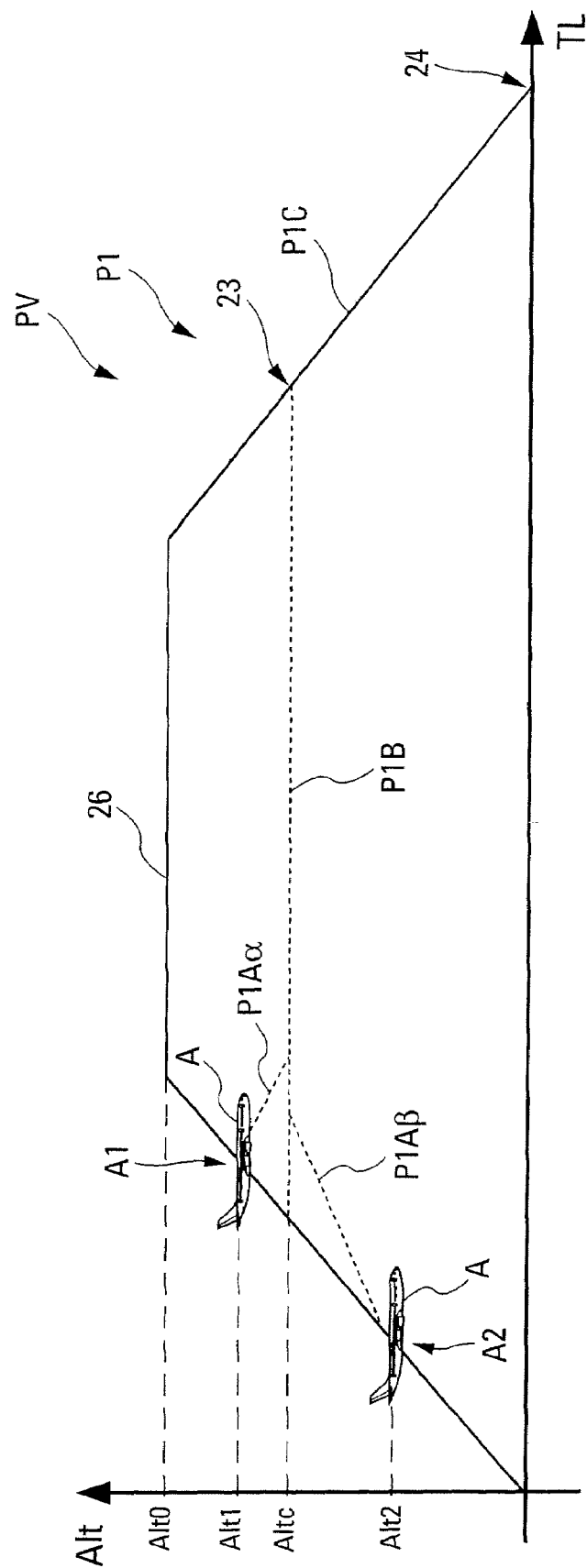
FIG. 2 is a graphical representation illustrating a flight profile that may be followed by an aircraft within the framework of the present invention.

According to the invention, said device 1 additionally comprises:

an array 3 of sources of information which notably comprise usual means capable of automatically determining, when a failure is detected by said means 2, the current values of parameters relating to the aircraft A, including notably its current position A1, A2 shown in FIG. 2, in other words its position at the time of the engine failure;

means 4 for automatically determining a number n of airports that are the n closest airports to the current position A1, A2 of the aircraft A, determined by said array 3. The number n is an integer which can be equal to 1. However, preferably, said integer is greater than 1. For this purpose, said means 4 notably determine the distances between, on the one hand, the current position A1, A2 of the aircraft A and, on the other, the position of a plurality of different airports, using information relating to the airports which is stored in said array 3, for example in a suitable database;

means 5 which are connected via a link 6 to said means 4 and which are formed in such a manner as to automatically determine, in a usual manner, for each of the n airports (the closest) determined by said means 4, a lateral trajectory TL (rectilinear) that allows the aircraft A each time to fly directly to the corresponding airport starting from said current position A1, A2;

means 7 which are connected via a link 8 to said means 5 and which are formed in such a manner as to determine, for each of these n airports, at least one associated flight profile. According to the invention, a flight profile PV associated with any given airport is defined along the lateral trajectory TL allowing this airport to be reached directly, and it is defined in accordance with a particular flight strategy, indicated hereinbelow. Each flight profile PV comprises, in the vertical plane, an altitude profile P1 (shown by way of example in FIG. 2 and further described hereinbelow) and a speed profile P2, defined along the corresponding lateral trajectory TL. The altitude profile P1 illustrates the variation in altitude of the aircraft A along the lateral trajectory TL, and the speed profile illustrates the variation in speed of the aircraft A along this lateral trajectory TL;

means 9 which are connected via a link 10 to said means 7 and which are formed in such a manner as to make predictions indicated hereinbelow for each of the various flight profiles determined by said means 7;

means 11 which are connected via a link 12 to said means 9 and which are formed in such a manner as to identify (and potentially to remove), depending on at least some of said predictions made by said means 9, from amongst the flight profiles determined by said means 7, those that do not satisfy pre-determined conditions indicated hereinbelow; and a display system 13 which is connected via a link 14 to said means 11 and which is formed in such a manner as to present, on at least one usual display screen 13A situated in the cockpit of the aircraft A, at least all the airports for which at least one of the flight profiles determined by said means 7 has not been removed by said means 11, together with the predictions (made by the means 9) corresponding to this or these flight profile(s).

Thus, the device 1 according to the invention automatically determines (and automatically presents to the flight crew), when an engine failure is detected, all the flight profiles allowing the aircraft A to fly to one or more destination airports which can be the initially planned arrival airport, the departure airport and/or one or more diversion airports. The technical crew, and notably a pilot of the aircraft A, is thus able to acquire, from a simple observation of the display screen 13A, an exact complete overview of the real situation, allowing him to quickly and calmly choose both the destination airport and the flight strategy (in the vertical plane) in order to fly there. This allows his workload and also his stress to be considerably reduced in such a situation which is particularly critical.

The device 1 according to the present invention therefore provides a valuable assistance in the management of an engine failure on a multi-engine aircraft A.

The means 4, 5, 7, 9 and 11 may be integrated into a unit 25, for example an FMS (Flight Management System), which is connected via links 21 and 22 to said means 2 and to said array 3, respectively.

In a preferred embodiment, said means 7 define, for each of the n airports, a plurality of flight profiles which are respectively determined according to one of a plurality of different flight strategies. In this case, said means 7 preferably take into account the following flight strategies:

a standard strategy or LRC (Long-Range Cruise) strategy, which consists in flying the aircraft A while minimizing the fuel consumption. This standard strategy defines an LRC speed and an LRC ceiling (or LRC altitude). The flight level and the speed (or Mach number) thus calculated are a function of the mass of the aircraft A and of the external temperature and may, in one particular embodiment, be kept constant, for example in order to facilitate coordination with air traffic control.

The descent toward a destination airport is carried out with a constant Mach number and speed, values which may be adapted depending on the type of aircraft A. In addition, a correction may be applied as a function of the mass of the aircraft A.

In this case, the compatibility of this standard strategy with the fuel consumption (a regulatory minimum fuel reserve must be available on arrival at the destination airport) and with respect to overflying obstacles should be verified. Generally speaking, the overfly margin must be at least equal to 1000 feet (around 300 meters) in level flight and to 2000 feet (around 600 meters) if the aircraft A is in descent;

a minimum flight time strategy (Min Time Strategy) which consists in flying the aircraft A at the highest possible speed, taking into account the maximum speed and/or Mach number with one engine inoperative. A constant high speed and Mach number, pre-defined according to the type of aircraft A, may be chosen, together with an intermediate altitude often in the neighbourhood of 17,000 feet (around 5000 meters). The maximum operating speed, or VMO (Velocity Max Operating) and the maximum operating Mach number, or MMO (Mach number Max Operating), which are constant, can also be chosen.

The descent toward a destination airport is carried out with constant Mach number and speed, values which may be adapted according to the type of aircraft A. A correction may be applied as a function of the mass of the aircraft A.

In this case, the compatibility of this strategy with respect to the fuel consumption and with respect to overflying obstacles should also be verified; and an obstacle clearance strategy which consists in flying the aircraft A as high as possible, in particular at optimum slope speed with one engine shutdown, which is referred to as "Greendot" (or "Gdot") on airplanes of the AIR-BUS type and which corresponds to the speed for current maximum L/D ratio, ensuring a minimal descent slope in absolute value.

The descent toward a destination airport is carried out with constant Mach number and speed, values which may be adapted according to the type of aircraft A. A correction may be applied as a function of the mass of the aircraft A.

In this case, the compatibility of this strategy with respect to the fuel consumption and with respect to overflying obstacles should also be verified.

In a preferred embodiment, for each of the various flight profiles, said means 9 preferably make predictions by implementing usual prediction functions allowing notably the following parameters to be obtained:

the time of arrival at the destination airport;
the quantity of fuel on arrival, in other words the quantity of fuel remaining on board the aircraft A at the destination airport;
the adherence to an obstacle clearance criterion; and
the altitude profile during the level changes.

In addition, said means 11 identify and, potentially, remove at least the flight profiles for which:

a prediction for fuel on arrival is below a pre-determined value; and
an obstacle clearance prediction is made with a height margin which is below an allowed vertical limit, in other words when the overfly cannot be achieved without risk of collision.

In addition, said means 11 also remove the flight profiles relating to airports comprising incompatible runways, in other words:

either runways whose length is below the landing capabilities of the aircraft A, taking into account the state of the runway and the mass of the aircraft A calculated at the predicted landing time;
or runways for which the conditions of visibility are too limiting to allow the aircraft A to land.

For this purpose, said means 11 use a certain number of numbered pieces of information, for example integrated into the array 3 of information sources and which can notably comprise:

the lengths of the runways of the various airports;
the state of the runways (dry, wet, flooded, snow-bound);
the availability of the runways (open, closed); and
the visibility or landing conditions (for example CATI, CATII, CATIII).

Furthermore, the display system 13 presents the various flight profiles on the display screen 13A, sorting them according to at least one pre-determined criterion, for example in decreasing order of flight time or in decreasing order of distance, for each of the flight strategies taken into account by the means 7. Such a display allows the appreciation of the situation by the pilot to be facilitated when he looks at the information presented on the display screen 13A.

In addition, in a preferred embodiment, said device 1 comprises, at its input, a certain number of numbered pieces of information, which are generally contained in the flight folder, such as notably:

for each of the portions of the flight plan, the diversion airport prescribed by the airline from that portion;
the general flight strategy in the vertical plane (from amongst the three aforementioned ones) in order to fly to this diversion airport; and
where required, flight level or speed (or Mach number) settings in order to fly to this diversion airport.

Depending on this proposal, the pilot can choose one of the various flight strategies in such a manner as to construct an active flight plan toward the diversion airport stated in the flight folder.

Furthermore, in a preferred embodiment, said device 1 additionally comprises:

selection means 15, for example a push-button, which allow an operator to select, preferably manually, one of the various flight profiles presented on the display screen 13A. In particular, a modification to the chosen flight strategy may be made by the flight crew. For example, once an obstacle or sizable mountain has been cleared, they can switch from a strategy with obstacle clearance to a standard strategy;

means 16 which are respectively connected via links 17 and 18 to said means 11 and to said selection means 15, and which are formed in such a manner as to automatically determine, in a usual manner, vectoring settings, in particular speed, altitude and thrust settings (indicated hereinbelow by way of example), allowing the aircraft A to fly according to the flight profile selected by the pilot by means of said selection means 15; and a usual guidance system 20 which is connected via a link 19 to said means 16 and which is formed in such a manner as to implement these vectoring settings automatically. This guidance system 20 can notably comprise a usual auto-pilot and/or a usual auto-throttle designed to control the thrust of the engines.

It goes without saying that the pilot of the aircraft may also apply the speed, altitude and/or thrust settings manually to the auto-pilot and to the throttle controls.

In addition, in a preferred embodiment, said device 1 automatically searches, from the list of diversion airports, for the one that is closest in terms of flight time at the time of the engine failure and could present it to the flight crew (on the display screen 13A) for them to make a selection. In fact, depending on the flight and weather conditions, the closest airport is not necessarily that stated in the flight folder for the position of the aircraft A at the time of the failure.

Furthermore, in another embodiment, the device 1 comprises, at its input, a certain number of numbered pieces of information contained in either the flight folder or in an on-board numerical database, preferably forming a part of said array 3 of information sources, such as notably:

the nature of the flight: for example of the OTS (Organized Track System) type or otherwise;

the cartography of the air traffic control sectors, together with the call frequencies.

These data allow the device 1 to automatically propose a short-term lateral trajectory to the pilot which allows, as far as is possible, a collision with another aircraft flying on the same lateral route (but at a lower level) or at the same flight level (but behind the aircraft A equipped with said device 1) to be avoided.

In addition, in the latter embodiment, in one particular variant:

said means 16 can automatically determine vectoring settings allowing the aircraft A to fly along said short-term lateral trajectory; and these vectoring settings can be transmitted to the guidance system 20 which then automatically implements them.

This particular variant therefore allows the aircraft to be automatically directed to a route avoiding the airways.

In one particular embodiment, said device 1 can determine and display on the display screen 13A a lateral trajectory which is offset, by an adaptable default value, from the trajectory obtained following a route change of 90°, and this is for the time the flight crew takes to validate the flight to the diversion airport.

In a preferred embodiment, said means 7 comprise elements (not shown) allowing the following steps to be respectively implemented with the aim of determining the flight profile PV relating to a particular flight strategy (in order to fly to a particular destination airport):

d1) calculate a setpoint altitude Altc which is characteristic of said particular flight strategy. This altitude Altc can vary over time, in particular for LRC strategies and strategies with obstacle clearance;

d2) calculate at least one speed parameter which is also characteristic of this flight strategy;

d3) compare the effective altitude Alt1, Alt2 of the aircraft A at the time of the failure with said setpoint altitude Altc which is characteristic of said flight strategy and, depending on the result of this comparison, determine a first profile P1Aα, P1Aβ allowing the aircraft A to fly to said setpoint altitude Altc, as shown in FIG. 2 which illustrates the altitude Alt along the lateral trajectory TL allowing the aircraft to fly to the destination airport;

d4) determine, using said speed parameter, a second profile P1B, corresponding to cruising flight at said setpoint altitude Altc, along the lateral trajectory TL as far as a point of descent 23;

d5) determine a third profile P1C corresponding to a descent profile from the setpoint altitude Altc toward the destination airport (situated at a point 24) by carrying out a calculation in the reverse direction from the airport toward the setpoint altitude; and d6) determine said point of descent 23 as the point of intersection between said descent profile P1C and the setpoint altitude Altc.

The altitude profile P1 of the flight profile PV sought corresponds to the succession of said first profile P1Aα, P1Aβ, of said second profile P1B and of said third profile P1C. In FIG. 2, the planned flight level 26 (altitude Alt0) is also shown at the origin (in the absence of engine failure).

The preceding step d3 can comprise two different variants, namely:

d3A) if the effective altitude Alt1 of the aircraft A at the time of the failure (at the position A1) is higher than said characteristic altitude Altc, determine a first flight profile P1Aα allowing the aircraft A to descend down to said setpoint altitude Altc, as shown in FIG. 2; and d3B) if the effective altitude Alt2 of the aircraft A at the time of the failure (at the position A2) is lower than said setpoint altitude Altc, determine a first flight profile P1Aβ allowing the aircraft A to climb to said setpoint altitude Altc, as is also shown in FIG. 2.

Hereinafter, the steps d1, d2, d3A, d3B, d4 and d5 are presented for each of the three following strategies:

the standard strategy (strategy S1);

the obstacle clearance strategy (strategy S2); and the strategy with minimum flight time (strategy 3).

For each of these steps, the altitude (or flight level), speed and thrust settings, associated with each flight strategy, are presented:

*Step d1: Determination of the Setpoint Altitude:

strategy S1: LRC ceiling which corresponds to a maximum flight level which is defined, in a usual manner, notably as a function of the current mass of the aircraft A and of the external temperature, preferably using a pre-determined table;

strategy S2: flight ceiling which corresponds to a maximum altitude which is defined, in a usual manner, as a function of the current mass of the air craft A and of the external temperature. This flight ceiling is determined, preferably, using a pre-determined table;

strategy S3: cruising altitude with one engine inoperative: pre-determined value, for example in the neighborhood of 17,000 feet (around 5000 meters);

*Step d2: Determination of the Speed Parameter:

strategy S1: LRC (Long-Range Cruise) Mach number or speed with two options:
  LRC speed calculated based on a cost index which is specific to an engine failure and which is appropriate to the type of aircraft A; or
  LRC Mach number and speed determined as a function of the LRC ceiling, of the mass and of temperature and preferably formed from a pre-determined table;

strategy S2: optimum slope speed with one engine inoperative (or Gdot speed) which is a function of the mass and of the altitude and which is preferably formed using a pre-determined table;

strategy S3: cruising speed or Mach number ("M") with one engine inoperative: M0.82/310 kt, where kt represents a knot corresponding to 0.514 m/s;

*Step d3A: Determination of the Descent Profile:

strategy S1: the objective flight level corresponds to the LRC ceiling, select Mach 0.82 then speed 300 kt except if the vertical speed is less than 500 ft/min, in which case select a rate of descent of 500 ft/min with a speed set accordingly; for the thrust, select an MCT (Maximum Continuous Thrust), which denotes the level of thrust generally applied to the motor(s) remaining operational, except during the last phase of descent toward the airport;

strategy S2: the objective flight level corresponds to the flight ceiling, the objective speed corresponds to the Gdot speed, and the objective thrust corresponds to the MCT;

strategy S3: the objective flight level corresponds to the cruising altitude with one engine inoperative except if the vertical speed is less than 500 ft/min, in which case select a rate of descent of 500 ft/min with a speed set accordingly, the objective speed is equal to M0.82/310 kt, and the objective thrust is equal to the MCT;

*Step d3B: Determination of the Climb Profile:

strategy S1: the objective flight level corresponds to the LRC ceiling, select Mach 0.82 then speed 300 kt; for the thrust, select the MCT;

strategy S2: the objective flight level corresponds to the flight ceiling, the objective speed corresponds to the Gdot speed, and the objective thrust corresponds to the MCT;

strategy S3: the objective flight level corresponds to the cruising altitude with one engine inoperative, the objective speed is equal to M0.82/310 kt, and the objective thrust is the MCT;

*Step d4: Cruising Flight:

strategy S1: LRC flight level (where necessary, recalculated during flight when the mass and/or temperature data have sufficiently changed), LRC flight speed, thrust level MCT;

strategy S2: the objective flight level corresponds to the flight ceiling, the objective speed corresponds to the Gdot speed, and the objective thrust corresponds to the MCT;

strategy S3: cruising speed—one engine inoperative, flight speed M0.82/310 kt, thrust level MCT;

*Step d5: Descent:

strategy S1: select Mach 0.82, then speed 300 kt, except if the vertical speed is less than 500 ft/min, in which case select a rate of descent of 500 ft/min with a speed set accordingly; for the thrust, select the idling level with an additional margin;

strategy S2: select Mach 0.82, then speed 300 kt, except if the vertical speed is less than 500 ft/min, in which case select a rate of descent of 500 ft/min with a speed set accordingly; for the thrust, select the idling level with an additional margin;

strategy S3: select Mach 0.82, then speed 300 kt, except if the vertical speed is less than 500 ft/min, in which case select a rate of descent of 500 ft/min with a speed set accordingly; for the thrust, select the idling level with an additional margin.

It will be noted that the aforementioned numerical values correspond to default reference values, which may be refined or modified for an improved optimization either by the airline before a flight or by the flight crew of the aircraft A during a flight.

The invention claimed is:

1. A method for assisting in the management of an engine failure on a multi-engine aircraft, according to which method the engines of said aircraft are monitored during a flight in such a manner as to be able to detect any engine failure and, when an engine failure is detected during the flight, the following series of successive steps is automatically carried out:
  a) the current values of parameters relating to the aircraft, including its current position, are determined;
  b) a number n of airports that are the n closest airports to said current position of the aircraft (A) is determined, where n is an integer;
  c) for each of these n airports, a lateral trajectory is determined that allows the aircraft to fly directly to the corresponding airport starting from said current position;
  d) for each of these n airports, at least one flight profile is determined that is defined according to the corresponding lateral trajectory in accordance with a flight strategy, the flight profile comprising, in the vertical plane, an altitude profile and a speed profile along the corresponding lateral trajectory, and predictions are made relating to each flight profile;
  e) depending on at least some of said predictions, flight profiles not satisfying pre-determined conditions are identified; and
  f) all the airports are shown on a display screen of the aircraft with highlighting for those that do not satisfy said pre-determined conditions, together with the associated conditions.

2. The method as claimed in claim 1, wherein, at step d), for each of the n airports are determined a plurality of flight profiles, which are respectively determined according to a plurality of different flight strategies.

3. The method as claimed in claim 2, wherein, at step d), the following flight strategies are used:
  a standard strategy consisting in flying the aircraft so as to minimize the fuel consumption;
  a strategy with minimum flight time consisting in flying the aircraft at the highest possible speed; and
  an obstacle clearance strategy consisting in flying the aircraft as high as possible.

4. The method as claimed in claim 1, wherein, at step d), at least the following predictions are made:
  the time of arrival;
  the quantity of fuel on board on arrival; and
  the adherence to an obstacle clearance criterion.

5. The method as claimed in claim 1, wherein, at step e), at least the flight profiles are identified for which:
  a destination fuel prediction is less than a pre-determined value; and
  an obstacle clearance prediction is made with a margin that is below an allowed vertical limit.

6. The method as claimed in claim 1, wherein, at step e), flight profiles relating to airports having incompatible runways are also identified.

7. The method as claimed in claim 1, wherein, at step f), the various flight profiles are presented sorting them according to at least one pre-determined criterion.

8. The method as claimed in claim 1, wherein, in addition:
  a selector that allows an operator to select one of said flight profiles presented at step f) on the display screen;
  vectoring settings are automatically determined allowing the aircraft to fly according to the flight profile selected using said selector; and
  the vectoring settings thus determined are automatically transmitted to a guidance system allowing them to be automatically implemented.

9. The method as claimed in claim 1, wherein, in addition, automatically:
  the closest airport in flight time from said current position is determined; and
  this airport is presented on the display screen.

10. The method as claimed in claim 1, wherein, in addition, automatically:
  a short-term lateral trajectory is determined preventing any collision of the aircraft with an aircraft in the neighborhood; and
  this short-term lateral trajectory is presented on the display screen.

11. The method as claimed in claim 10, wherein:
  vectoring settings are determined automatically that allow the aircraft to fly along said short-term lateral trajectory; and
  these vectoring settings are automatically transmitted to a guidance system allowing them to be automatically implemented.

12. The method as claimed in claim 1, wherein, in addition, automatically:
  a lateral trajectory is determined that is offset by a particular distance with respect to an initial trajectory obtained following a change of route, said particular distance being adaptable; and
  this lateral trajectory is presented on the display screen.

13. The method as claimed in claim 1, wherein, at step d), for each of the n airports, the following series of operations are carried out with the aim of determining the flight profile relating to a particular flight strategy;
  d1) a setpoint altitude is calculated which is characteristic of said flight strategy;
  d2) at least one speed parameter is calculated which is also characteristic of said flight strategy;
  d3) the effective altitude of the aircraft when the engine failure occurs is compared with the setpoint altitude which is characteristic of said flight strategy and, depending on the result of this comparison, a first profile allowing the aircraft to fly to said setpoint altitude is determined;
  d4) using said speed parameter, a second profile is determined that corresponds to cruising flight at said setpoint altitude along the corresponding lateral trajectory as far as the point of descent;
  d5) a third profile is determined that corresponds to a descent profile from the setpoint altitude to the corresponding airport, by performing a calculation in reverse from the airport back to the setpoint altitude; and
  d6) said point of descent is determined as the point of intersection between said descent profile and the setpoint altitude, said flight profile corresponding to the succession of said first, second and third profiles thus determined.

14. A device for assisting in the management of an engine failure on a multi-engine aircraft, said device comprising:
  a failure detection section that automatically detects, during a flight of the multi-engine aircraft, a failure of an engine of said aircraft;
  a parameter value determining section that automatically determines, when an engine failure is detected by said failure detection section, the current values of parameters relating to the aircraft, including its current position;
  an airport determining section that automatically determines a number n of airports which are the n closest airports to said current position of the aircraft, n being an integer;
  a lateral trajectory determining section that automatically determines, for each of these n airports, a lateral trajectory allowing the aircraft to fly directly to the corresponding airport starting from said current position;
  a flight profile determining section that automatically determines, for each of these n airports, at least one flight profile defined according to the corresponding lateral trajectory in accordance with a flight strategy, said flight profile comprising, in the vertical plane, an altitude profile and a speed profile along the corresponding lateral trajectory, and for making predictions relating to each flight profile;
  a flight profile identifying section that automatically identifies, depending on at least some of said predictions, flight profiles that do not satisfy pre-determined conditions; and
  a display system for presenting, on a display screen of the aircraft, all the airports, highlighting those that do not satisfy said pre-determined conditions, together with the associated predictions.

15. The device as claimed in claim 14, wherein said device additionally comprises:
  a selector that allows an operator to select one of said flight profiles presented on the display screen;
  a vector setting determining section that automatically determines vectoring settings allowing the aircraft to fly according to the selected flight profile using said selector; and
  a guidance system allowing said vectoring settings to be implemented automatically.

16. The device as claimed in claim 14, wherein said device comprises, at its input, at least some of the following information:
  for each portion of a flight plan, a prescribed diversion airport;
  a flight strategy in the vertical plane for flying to this destination airport; and
  flight level and speed settings for flying to this destination airport.

17. An aircraft, wherein said aircraft comprises a device such as that specified in claim 14.

* * * * *